(No Model.) 2 Sheets—Sheet 1.
G. L. THOMPSON.
CRIMPING TONGS.
No. 570,413. Patented Oct. 27, 1896.
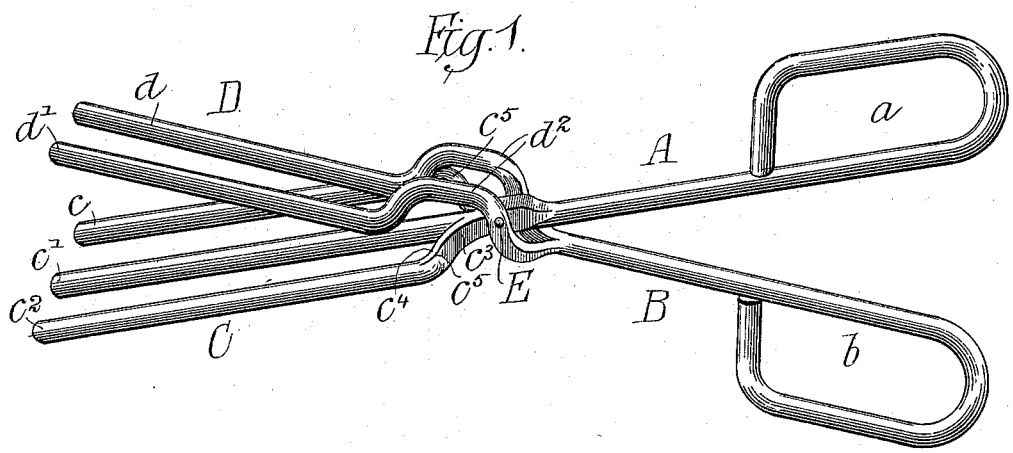
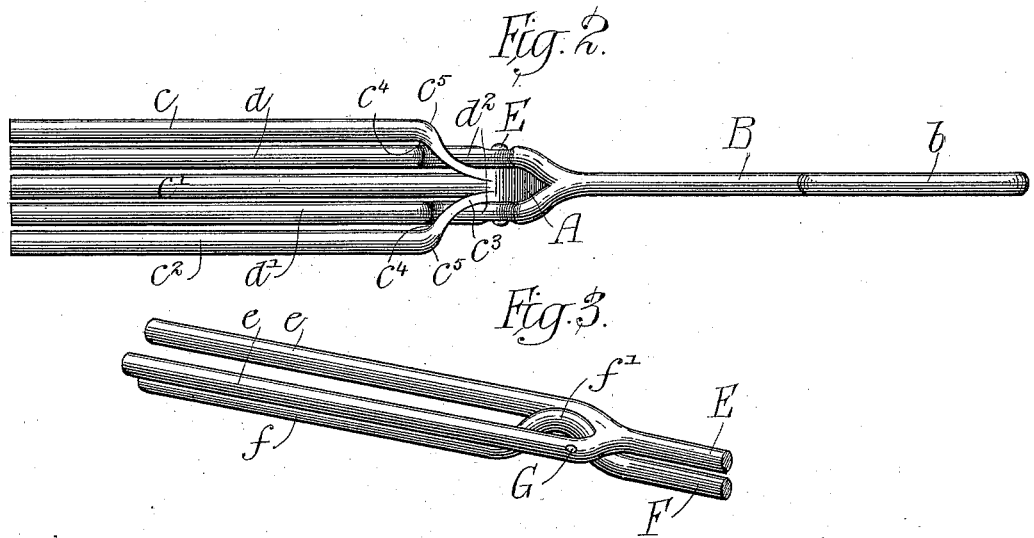
Witnesses
Wm. M. Rheem.
Louis M. F. Whitehead.
Inventor
George L. Thompson.
By Dayton, Poole + Brown
Atty's.

(No Model.) 2 Sheets—Sheet 2.

G. L. THOMPSON.
CRIMPING TONGS.

No. 570,413. Patented Oct. 27, 1896.

Witnesses.
C. E. Tomlinson.
Louis M. F. Whitehead.

Inventor:
George L. Thompson.
by Dayton, Poole & Brown
Atty.s.

UNITED STATES PATENT OFFICE.

GEORGE L. THOMPSON, OF CHICAGO, ILLINOIS.

CRIMPING-TONGS.

SPECIFICATION forming part of Letters Patent No. 570,413, dated October 27, 1896.

Application filed July 25, 1892. Serial No. 441,140. (No model.)

*To all whom it may concern:*

Be it known that I, GEORGE L. THOMPSON, of Chicago, in the county of Cook and State of Illinois, have invented certain new and useful Improvements in Crimping-Tongs; and I do hereby declare that the following is a full, clear, and exact description thereof, reference being had to the accompanying drawings, and to the letters of reference marked thereon, which form a part of this specification.

This invention relates to hair-crimping tongs, and has for its object to simplify the construction, facilitate the finishing, and reduce the cost of manufacture of such implement without sacrifice of the necessary strength or lessening the ease of manipulation thereof.

To this end the invention consists in the matters hereinafter described, and pointed out in the appended claims.

Figure 4:
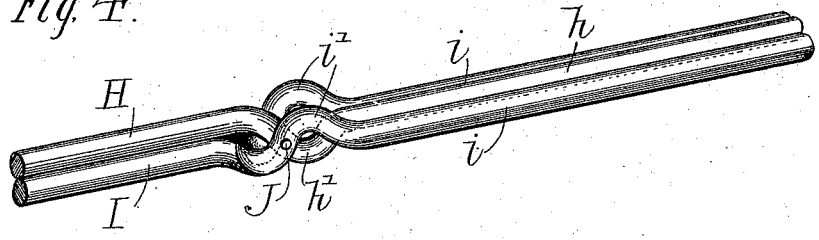
Figure 5:
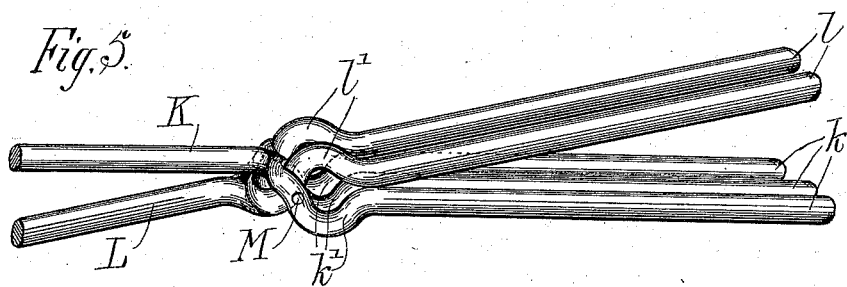
Figure 6:
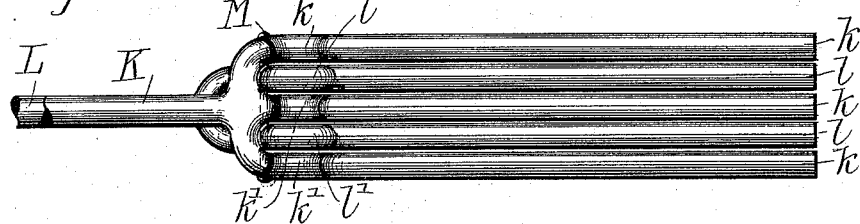

In the accompanying drawings, Figure 1 is a perspective view of a pair of crimping-tongs embodying my improvement. Fig. 2 is a plan view thereof. Fig. 3 is a perspective view of the tines or jaws of another form of crimping-tongs embodying a principal feature of my invention. Fig. 4 is a similar view showing a construction somewhat different from that shown in Fig. 3. Fig. 5 is a perspective view of the jaws of a five-tined implement of different form from that shown in Figs. 1 and 2. Fig. 6 is a plan view of the implement shown in Fig. 5.

As illustrated in Figs. 1 and 2, the crimper is composed of two shanks A and B, each shaped or bent at one end to form hand-loops, as indicated by $a$ and $b$, and having at its opposite end a fork provided with a plurality of tines, as indicated at C and D.

The fork C of the shank A consists of three tines $c\ c'\ c^2$, the outer tines $c$ and $c^2$ being provided at their inner ends with shoulders $c^5\ c^5$, formed by outward bends $c^3\ c^3$ and reverse bends $c^4\ c^4$, whereby the main parts of said outer tines $c$ and $c^2$ are brought parallel with the central tine $c'$ and at a distance therefrom a little greater than their width.

The fork D of the shank B is composed of two tines $d$ and $d'$, parallel with each other and provided at their inner ends with offset parts or arches $d^2\ d^2$, within which the shoulders $c^5\ c^5$ of the shank A rest when the parts are in their closed position and the sides of which near the shank are transversely pierced to receive a pivot-pin E, which also passes through a transverse opening in the shank A near its junction with the fork C, thus forming a pivot-joint.

Each of the shanks A and B may be formed from a single blank in a suitable die or by hand, or the tines $c$ and $c^2$ of the shank A may be welded to the sides of a blank from which the shank and central tine $c$ is formed, while the tines $d$ and $d'$ are attached to the shank B.

In the employment of either mode of construction the parts are finished by any suitable method of smoothing and polishing metal and assembled as hereinbefore described.

In Fig. 3 I have shown a modification consisting of two shanks E and F, of which the shank E is provided with two tines $e\ e$ and the shank F with a single tine $f$, having an arch or offset $f'$ at its inner end or that adjacent to the shank, the parts being connected in this instance by a pivot-pin G, passing through the tines $e\ e$ and the arched part of the tine $f$.

The implement in both forms above described has one straight member and another member which is arched or offset to form the pivotal joint between the members; but in Figs. 4, 5, and 6 I have shown a construction wherein both parts or members are arched or offset, the feature possessed in common by all of these forms being that the parts are made to cross or intersect each other adjacent to the pivot in such manner that the pivot-pin may be inserted therethrough and a hinged joint thereby formed.

As shown in Fig. 4, the implement consists of two shanks H and I, of which the shank H is provided with a single tine $h$ and the shank I with two tines $i\ i$. The tines of both members are provided with arches or offsets $h'\ i'\ i'$ adjacent to the shanks, said arches or offsets being so arranged that the tines cross or intersect each other at a point convenient for the insertion of a pivot-pin J near the shanks.

In Fig. 5 is shown a form of implement consisting of a shank K, provided with three tines $k\ k\ k$, and a shank L, provided with two tines $l\ l$. These tines are provided with arches $k'\ k'\ k'$ and $l'\ l'$, and the members are connected by a pivot M, inserted through the arched parts of the tines adjacent to the shank in the same manner as illustrated in connection with the three-tined form shown in Fig. 4.

A main feature of the invention is embraced in a construction wherein the tines of one or both parts of the implement are separated from each other to a point beyond or at the rear of the pivotal joint connecting the parts or members, and wherein one part intersects and passes between the tines of the other part, and the parts are connected by a pivot-pin passing through the tines of one part and the shank of the other part where it intersects said tines or the tines of both parts at their point of intersection. The obvious advantage of this construction is that a strong and reliable joint is formed without the necessity of employing accurately-fitted, overlapping, or interpenetrating parts on the shank to form the joint, as has heretofore been the practice. These advantages apply equally to the two forms shown, to wit, that in which the shank of one part is pivoted between the tines of the other part and that in which the tines of both parts are arranged to cross each other and a pivot inserted through them, it being obvious that in both cases a strong and durable joint is formed with little labor in addition to that required for making the tines themselves. This simplicity and economy in manufacture is well illustrated in the case of the article having three tines only, (shown in Fig. 3,) from which it will be seen that the tines $e\ e$ are formed in the usual manner and that no additional labor is necessary to form the hinge, except to properly bend the shank F and insert the pivot-pin through the parts. Similarly in the form shown in Fig. 4 the tines $i\ i$ are made in the usual manner and the only additional labor required for making the pivotal joint is to form the arches or offsets in both parts and insert the pivot-pin through the arches at their points of intersection. A saving of labor is similarly effected in making an article with five or more tines, it being obvious that the additional tines (shown in Fig. 1) are secured outside of the pivotal joint, which is formed between the two central tines of one part and the shank of the other part, so that no special labor in forming the joint is required.

In the form shown in Figs. 5 and 6 the tines are formed on the two shanks, three on one and two on the other, in the same manner as would be necessary for making the jaws in case the shanks of the members were pivotally connected and the pivotal joint was formed by inserting the pivot through the tines.

In the construction shown in Figs. 4, 5, and 6 the tines are bent in the manner shown merely to bring the shanks and the working parts or outer ends of the tines into proper relation with each other when the parts are closed, and the bending of the tines to the particular form shown is not essential.

The form of the five-tined implement shown in Figs. 1 and 2 has the advantage of being somewhat more easy to construct and compact and neat in appearance than the other one illustrated in Figs. 5 and 6, and said form shown in Figs. 1 and 2 being in itself new is herein claimed as part of my invention.

I claim as my invention—

1. A crimping implement comprising a member having two or more tines and a second member having one or more tines, said second member being inserted between the tines of the first member and being pivotally connected therewith by a pivot-pin inserted through the tines of said first member.

2. A crimping implement comprising a member having two or more tines and a second member having one or more tines, the shank of said second member being inserted between the tines of the first member, and pivotally connected with the same by a pivot-pin inserted through said tines and said shank.

3. A crimping implement comprising a forked shank having two tines provided with arches at their inner ends, and a second forked shank pivoted between the tines of the first-named shank, said second shank having three tines, of which the outer ones are bent to form shoulders to rest within the said arches when the tines are brought together, substantially as described.

In testimony that I claim the foregoing as my invention I affix my signature in presence of two witnesses.

GEORGE L. THOMPSON.

Witnesses:
E. R. McCARTY,
F. ALLSTROM.